(12) United States Patent
Pechtold et al.

(10) Patent No.: US 8,522,597 B2
(45) Date of Patent: Sep. 3, 2013

(54) CALIBRATION OF A PRESSURE SENSOR IN A HYDROGEN STORAGE SYSTEM

(75) Inventors: Rainer Pechtold, Hunstetten (DE); Michael Leykauf, Darmstadt (DE); Ingo Hermann, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 429 days.

(21) Appl. No.: 12/881,774

(22) Filed: Sep. 14, 2010

(65) Prior Publication Data

US 2012/0060583 A1 Mar. 15, 2012

(51) Int. Cl.
*G01L 27/00* (2006.01)
(52) U.S. Cl.
USPC .......................................................... 73/1.57
(58) Field of Classification Search
USPC .......................................................... 73/1.57
See application file for complete search history.

(56) References Cited

U.S. PATENT DOCUMENTS 5,597,020 A * 1/1997 Miller et al. ..................... 141/95
2009/0035612 A1 * 2/2009 Suematsu et al. ............... 429/13

* cited by examiner

*Primary Examiner* — Hezron E Williams
*Assistant Examiner* — Paul West
(74) *Attorney, Agent, or Firm* — John A. Miller; Miller IP Group, PLC

(57) ABSTRACT

A method and system for automatically calibrating a pressure sensor in a hydrogen storage system for a fuel cell vehicle. A low-range pressure sensor in the fuel cell system, which has much greater accuracy at low pressure readings, is used to calibrate a high-range pressure sensor in the hydrogen storage system. This calibration can only be done when a pressure regulator situated between the two sensors is in a fully open position. In such a condition, the high-range sensor can be calibrated to the value of the low-range sensor, thus improving the accuracy of the high-range sensor's readings. The calibration can be a simple setting of the high-range sensor to the value of the low-range sensor under static conditions, or the calibration can be done while gas is flowing from the hydrogen storage system to the fuel cell by accounting for the pressure drop between the two sensors.

17 Claims, 3 Drawing Sheets

CALIBRATION OF A PRESSURE SENSOR IN A HYDROGEN STORAGE SYSTEM

BACKGROUND OF THE INVENTION

1. Field of the Invention

This invention relates generally to calibration of pressure sensors for a hydrogen storage system and, more particularly, to a method and system for calibrating pressure sensors used in a hydrogen storage system for a fuel cell vehicle which uses a pressure reading from a low-range pressure sensor outside the hydrogen storage system to calibrate a high-range pressure sensor inside the hydrogen storage system, to reduce the tolerance band at the low end of the high-range sensor's range.

2. Discussion of the Related Art

Fuel cell vehicles are expected to rapidly increase in popularity in the near future in the automotive marketplace. Fuel cell vehicles offer several desirable features, such as virtually pollution-free emissions, and avoiding vehicle usage of petroleum fuels. A key component of fuel cell vehicles is the hydrogen storage system, which stores the hydrogen used as a fuel by most fuel cell vehicles. Hydrogen storage systems typically consist of one or more interconnected pressure vessels for storing gaseous hydrogen, along with numerous valves, gauges, and fittings necessary for operation of the hydrogen storage system. Maximizing vehicle driving range, while fitting within packaging constraints and meeting regulatory requirements, is a key consideration in the design of hydrogen storage systems for fuel cell vehicles.

Fuel cells require a reliable source of hydrogen gas at a prescribed pressure. A pressure regulator is used to reduce the hydrogen gas from the high pressure at which it is stored in the vessels to the lower prescribed pressure required by the fuel cell. However, the pressure vessels used in hydrogen storage systems cannot tolerate rapid refilling from an excessively low hydrogen pressure, so the fuel cell in a vehicle must be shut down if the pressure in the hydrogen storage system reaches a minimum allowable pressure value. Unfortunately, pressure sensors capable of measuring the high hydrogen pressures typically seen in the vessels are not very accurate at low pressure ranges. Therefore, in current hydrogen storage systems, it cannot be precisely determined when the pressure in the hydrogen storage system has reached the minimum allowable pressure. As a result, a tolerance band must be applied to the pressure reading, and the fuel cell must be shut down when the pressure reading minus the tolerance value reaches the minimum allowable pressure.

There is a need for a calibration methodology for a pressure sensor in a hydrogen storage system which improves the accuracy of pressure readings at the low end of the sensor's range. Such a method would enable a more precise reading of hydrogen pressure when the storage vessels are nearly empty, thus eliminating the large tolerance band around the pressure reading, avoiding the premature shutdown of the fuel cell, and allowing significantly more hydrogen fuel to be used to power the vehicle. As a result, the vehicle will have a greater driving range between refueling stops, which is a real benefit to the driver.

SUMMARY OF THE INVENTION

In accordance with the teachings of the present invention, a method and system are disclosed for automatically calibrating a pressure sensor in a hydrogen storage system for a fuel cell vehicle. A low-range pressure sensor in the fuel cell system, which has much greater accuracy at low pressure readings, is used to calibrate a high-range pressure sensor in the hydrogen storage system. This calibration can only be done when a pressure regulator situated between the two sensors is in a fully open position. In such a condition, the high-range sensor can be calibrated to the value of the low-range sensor, thus greatly improving the accuracy of the high-range sensor's readings at the low end of its range. The calibration can be a simple setting of the high-range sensor to the value of the low-range sensor under static (no flow) conditions, or the calibration can be done while hydrogen gas is flowing from the hydrogen storage system to the fuel cell by accounting for the pressure drop between the two sensors.

Additional features of the present invention will become apparent from the following description and appended claims, taken in conjunction with the accompanying drawings.

DETAILED DESCRIPTION OF THE EMBODIMENTS

The following discussion of the embodiments of the invention directed to calibration of a pressure sensor in a hydrogen storage system is merely exemplary in nature, and is in no way intended to limit the invention or its applications or uses. For example, the disclosed methods and systems have particular application to a hydrogen storage system for a fuel cell vehicle, but may also be applicable to calibration of pressure sensors in any gas storage or gas handling system.

Fuel cells can be designed to use a variety of fuels, but the fuel cells being developed for most automotive applications use hydrogen gas as a fuel. Such fuel cells require a reliable source of hydrogen gas, typically provided by a hydrogen storage system.

Figure 1:
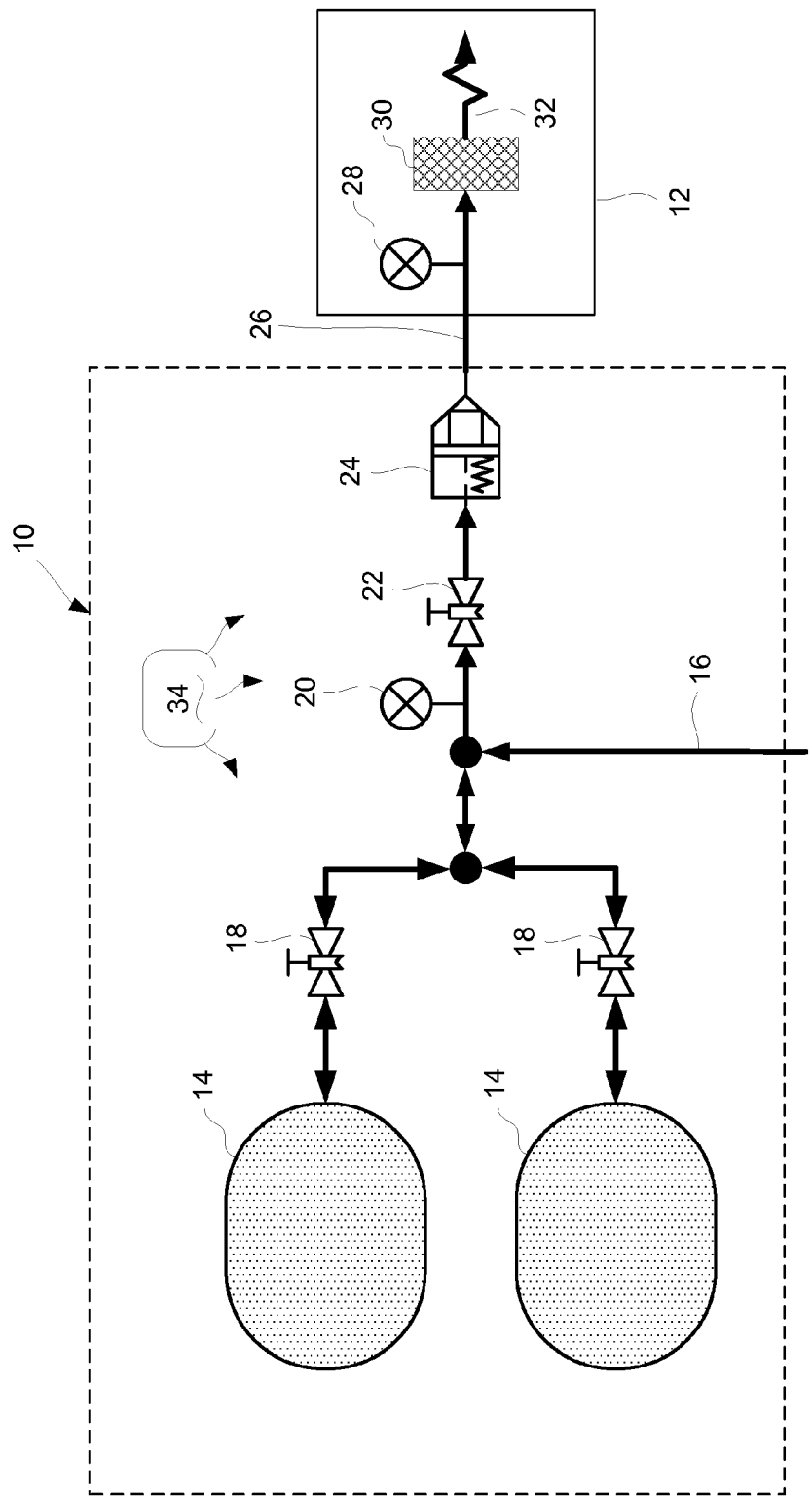
FIG. 1 is a schematic diagram of a hydrogen storage system for a fuel cell.

FIG. 1 is a schematic diagram of a hydrogen storage system 10 for a fuel cell 12. The hydrogen storage system 10 includes pressure vessels 14 which are charged with hydrogen from an external supply (not shown) via a filler line 16. The hydrogen storage system 10 is shown with two of the pressure vessels 14, however, more or fewer than two of the vessels 14 could be used. Shut-off valves 18 are situated downstream of each of the vessels 14. The terms upstream and downstream are used throughout this disclosure with respect to the direction of flow from the pressure vessels 14 to the fuel cell 12. A pressure sensor 20 provides pressure measurement capability just upstream of a shut-off valve 22 and a pressure regulator 24. The pressure regulator 24 reduces the pressure of the hydrogen from the high and variable pressure values of the vessels 14 down to a low and constant pressure value appropriate for the fuel cell 12. A fuel supply line 26 connects the hydrogen storage system 10 to the fuel cell 12.

A pressure sensor 28 measures the pressure at the inlet of the fuel cell 12. A filter 30 filters the hydrogen gas before the hydrogen passes through line 32 to the fuel cell anode (not shown) for consumption. A controller 34—in communication with the shut-off valves 18, the pressure sensor 20, the shut-off valve 22, the pressure regulator 24, the pressure sensor 28, and the fuel cell 12—can be used to monitor conditions in the hydrogen storage system 10 and the fuel cell 12, and control a calibration sequence as discussed below. For simplicity, the remainder of the components of the fuel cell 12 are not shown, nor are various filters, check valves, relief valves, and other components of the hydrogen storage system 10.

The pressure of the hydrogen gas contained in the pressure vessels 14, and measured by the pressure sensor 20, can be as much as 700 bar or even higher. As a result, a high-range transducer or sensor must be used for the pressure sensor 20, and high-range sensors inherently have a high tolerance band around their pressure readings, which can be especially problematic for pressure readings at the low end of their range. A typical pressure transducer or pressure sensor, such as the pressure sensor 20, consists of a membrane and possibly several electronic components configured such that an output voltage signal is produced which is proportional to the pressure differential being experienced by the membrane. Each of the components of the sensor 20 has a base tolerance which can be represented as a plus or minus pressure variance. In addition, each of the components of the sensor 20 also experiences long-term drift, which further impacts the accuracy of the sensor 20. When all of the tolerances of the components are added up, a typical high-range pressure transducer or sensor, such as the pressure sensor 20, can have tolerances of +/−30 bar or higher.

The high tolerance band creates a problem for the hydrogen storage system 10, because the high tolerance band on the pressure readings at the pressure sensor 20 make it difficult to accurately determine how much hydrogen actually remains in the vessels 14. For reliability reasons, the pressure vessels 14 are designed to be pressurized once to a certain level, and henceforth the pressure in the vessels 14 should not be allowed to drop below a certain minimum allowable pressure. For example, the vessels 14 may have a minimum allowable pressure of 20 bar. If the pressure sensor 20 has a tolerance of +/−30 bar, then the minimum allowable pressure of 20 bar could possibly be reached when the pressure sensor 20 reads 50 bar (20 bar actual pressure plus 30 bar tolerance). Therefore, with a +/−30 bar tolerance around readings at the sensor 20, the hydrogen storage system 10 would have to be designed to shut down when the pressure reading at the sensor 20 reaches 50 bar in order to protect the vessels 14. However, due to the uncertainty of the pressure reading at the sensor 20, the actual pressure remaining in the vessels 14 may be as high as 80 bar (the 50 bar reading plus the 30 bar tolerance) in such a situation. The result of all of this is that the hydrogen storage system 10 and the fuel cell 12 will have to be designed to shut down when, in most cases, a significant usable amount of hydrogen still remains in the vessels 14.

The minimum allowable pressure of 20 bar is also prescribed in order to keep the volume flow rate below a reasonable limit while achieving a mass flow rate required to operate the fuel cell 12 at full power. Without the minimum allowable pressure limit, the high volume flow rates experienced during low vessel pressure conditions would require larger pipes and fittings throughout the hydrogen storage system 10.

The problem described in the preceding paragraphs can be minimized by reducing the tolerance band around the pressure reading at the sensor 20. This can be accomplished by calibrating the pressure sensor 20 at the low end of its range, thus greatly reducing the tolerance, typically from a value of +/−30 bar down to a value of about +/−5 bar. In the case of a +/−30 bar tolerance, the actual pressure in the vessels 14 could be anywhere between 20 and 80 bar when the fuel cell 12 needs to be shut down due to minimum allowable pressure. In contrast, in the case of a +/−5 bar tolerance, the actual pressure in the vessels 14 could be anywhere between 20 and 30 bar when shutdown is required. The extra 50 bar of usable hydrogen pressure (80 bar minus 30 bar) represents significant extra range for the vehicle which is being powered by the fuel cell 12.

Figure 2:
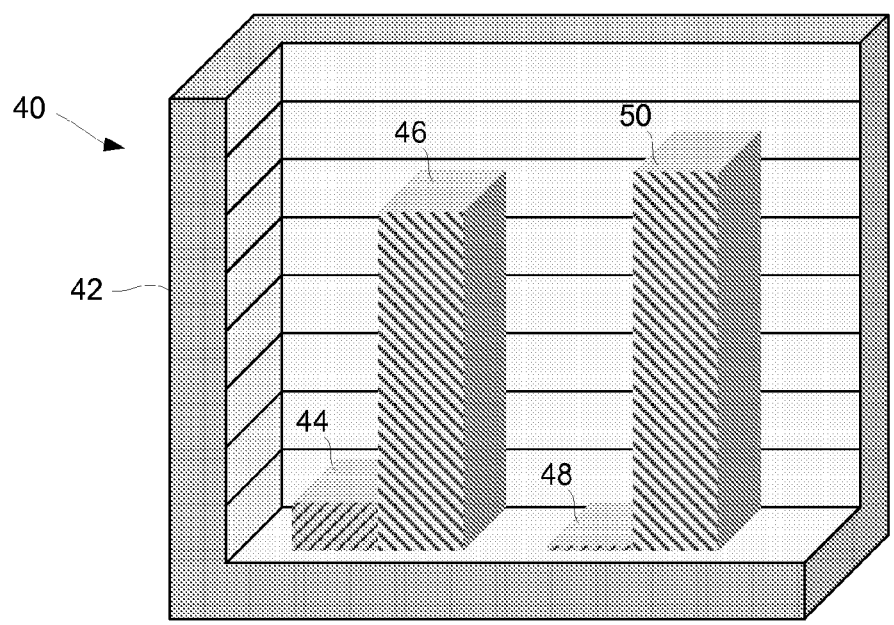
FIG. 2 is a bar chart showing how the driving range of a fuel cell vehicle can be improved by pressure sensor calibration.

FIG. 2 is a bar chart 40 showing how the driving range of a fuel cell vehicle can be improved by pressure sensor calibration. Vertical axis 42 represents driving range. Bar 44 shows the loss of range experienced due to high tolerances in pressure readings, in a typical fuel cell vehicle with no pressure sensor calibration. Bar 46 shows the total driving range of the same typical fuel cell vehicle. Bar 48 shows the loss of range which would be experienced by a fuel cell vehicle in which pressure sensor calibration is carried out as discussed above. Bar 50 shows the total driving range of the fuel cell vehicle in which pressure sensor calibration is carried out. It can be seen that the loss of driving range is significantly reduced between the bar 44 and the bar 48, while total driving range is increased by the same amount from the bar 46 to the bar 50. While the bar chart 40 is provided without a mileage scale, it is noted that a driving range increase of 50 miles is possible, in a vehicle with a nominal driving range of 350-400 miles, through pressure sensor calibration.

The calibration of the pressure sensor 20 can be accomplished as follows. As shown in FIG. 1 and described above, the pressure sensor 28 can only experience the relatively low pressure hydrogen gas required by the fuel cell 12. The pressure at the sensor 28 would typically be less than 10 bar. Therefore, the pressure sensor 28 can be a low range design, with a maximum range of about 20 bar being sufficient. This is in contrast to the range of 700 bar or higher for the pressure sensor 20. Thus, the pressure sensor 28, by virtue of its low range, will have an inherently smaller tolerance. The sensor 28 can then be used to calibrate the sensor 20, under certain circumstances.

If the pressure at the sensor 20 decreases to a low enough value, the pressure regulator 24 will be fully open, the pressure at the sensors 20 and 28 will be essentially equal, and the sensor 20 can be calibrated to the sensor 28. Because the regulation pressure of the regulator 24 is typically lower than the minimum allowable pressure in the vessels 14, the calibration scenario described in this paragraph will not be possible by simply driving the vehicle until the vessels 14 are nearly empty. Instead, a special service or shutdown sequence is required to provide the conditions necessary for calibration. This can easily be accomplished using the controller 34 by closing the shut-off valves 18 with the fuel cell 12 running, and allowing the pressure at the sensor 20 to drop through the regulation pressure of the regulator 24. If, any time after the pressure regulator 24 is fully open, a shut-off valve (not shown) downstream of the sensor 28 in the fuel cell 12 is closed, thus stopping the flow of hydrogen gas through the regulator 24, the pressure sensors 20 and 28 will be experiencing the same static pressure, and the sensor 20 can be calibrated to the sensor 28. Static pressure equilibrium can also be achieved by allowing the pressure at the sensors 20 and 28 to drop to zero after closing the shut-off valves 18.

As would be understood by one skilled in the art, calibrating a first pressure sensor against, or to, a second pressure sensor means adjusting the reading of the first pressure sensor to match the reading of the second pressure sensor. In other words, the second pressure sensor is believed to be more accurate, so the first pressure sensor is adjusted to match it.

Figure 3:
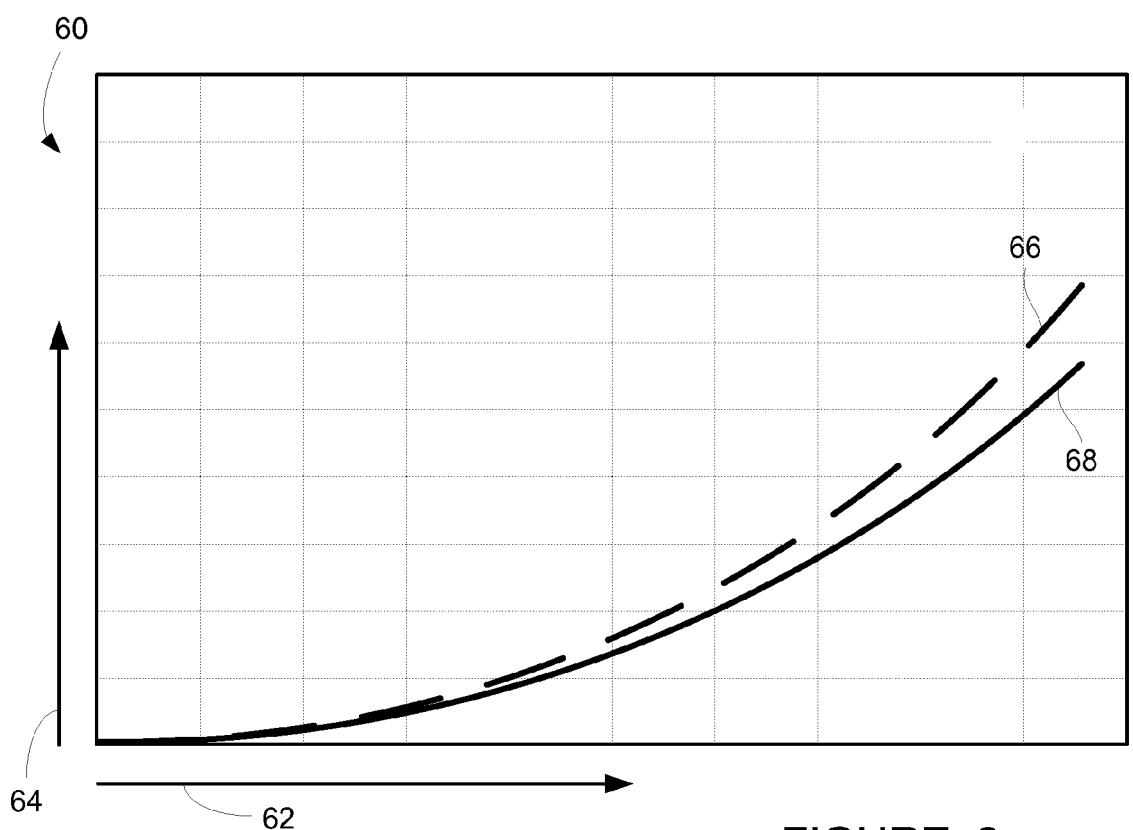
FIG. 3 is a graph showing how the pressure drop between a high-range pressure sensor and a low-range pressure sensor can be computed for various flow rate and pressure conditions.

Even if the fuel cell 12 is not shut down, and hydrogen gas is flowing through the regulator 24, the pressure sensor 20 can be calibrated to the pressure sensor 28 by accounting for the pressure drop between the two. FIG. 3 is a graph 60 showing how the pressure drop between the pressure sensor 20 and the pressure sensor 28 can be computed for various flow rate and pressure conditions. Horizontal axis 62 represents mass flow rate of hydrogen gas through the regulator 24. Vertical axis 64 represents pressure drop between the sensor 20 and the sensor 28. Curve 66 shows the pressure drop as a function of mass flow rate when the pressure at the sensor 28 is 3 bar. Curve 68 shows the pressure drop as a function of mass flow rate when the pressure at the sensor 28 is 5 bar. The data contained on the graph 60 can be measured across the range of pressures and mass flow rates expected at the pressure sensor 28, thus allowing the calibration of the pressure sensor 20 while hydrogen gas is flowing to the fuel cell 12.

Figure 4:
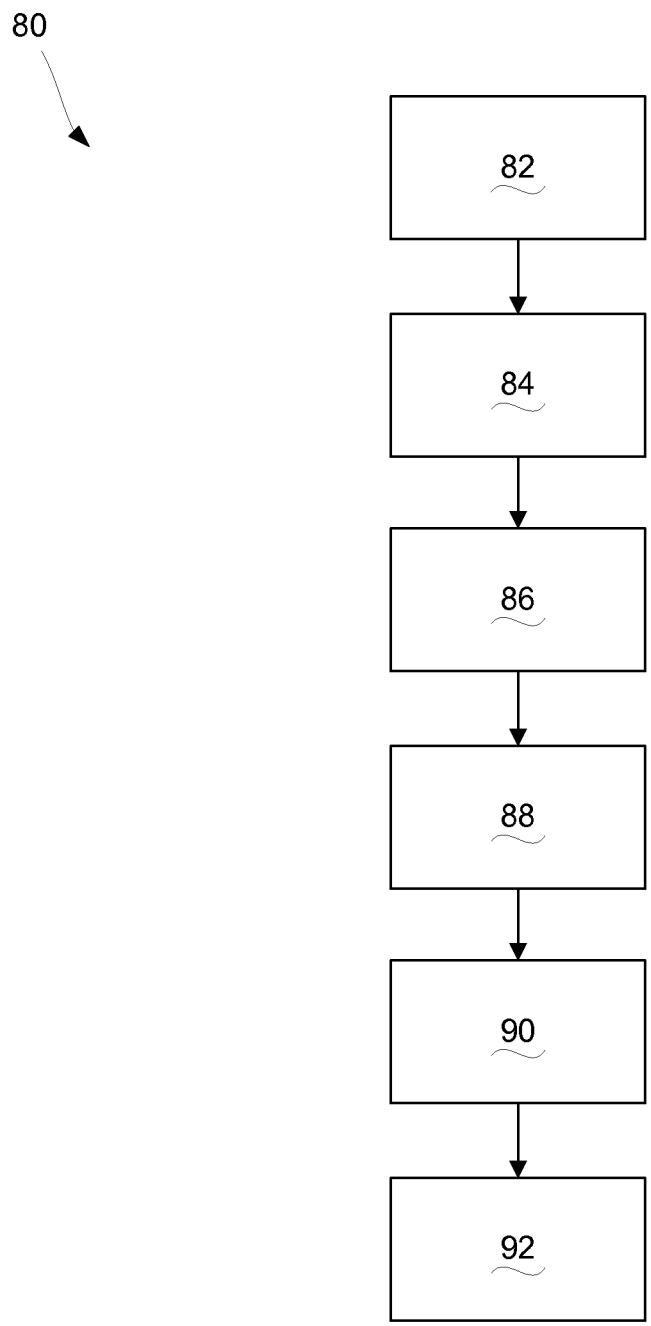
FIG. 4 is a flow chart diagram of a method which can be used to calibrate a high-range pressure sensor in the hydrogen storage system of FIG. 1.

FIG. 4 is a flow chart diagram 80 of a method which can be used to carry out the calibration of the pressure sensor 20 described above. At box 82, the hydrogen storage system 10 is operated with the valves 18 and 22 open, providing hydrogen fuel to the fuel cell 12. At box 84, the pressure at the sensors 20 and 28 is monitored by the controller 34. At box 86, the shut-off valves 18 are closed, preventing the flow of hydrogen downstream from the pressure vessels 14. At box 88, the pressure at the sensors 20 and 28 is allowed to drop to the regulation pressure of the regulator 24, which will happen quickly with the valves 18 closed. At box 90, the controller 34 verifies that the regulator 24 is fully open. This could be done by detecting a drop in pressure from the previously constant value at the sensor 28. Some pressure regulators, such as the regulator 24, may also be capable of sending a signal to the controller 34 to indicate that a fully open position has been reached. At box 92, the pressure sensor 20 is calibrated by setting its output value equal to the pressure reading of the pressure sensor 28. As discussed above, the calibration step at the box 92 can be carried out in either a static (no flow) environment, or when hydrogen gas is flowing by accounting for the pressure drop between the sensors 20 and 28.

By calibrating the high-range pressure sensor 20 to the value of the low-range pressure sensor 28 using the method described above, it is possible to greatly improve the accuracy of pressure readings within the hydrogen storage system 10, thus enabling much more complete consumption of the hydrogen available in the pressure vessels 14.

Throughout the discussion of the calibration process shown on the flow chart diagram 80, it is to be understood that the pressure sensor 20 is of a type that can be calibrated in a non-manual fashion, such as by the controller 34. For example, the controller 34 would know the reading of the pressure sensor 28. At the box 92, the controller 34 could send a signal to the pressure sensor 20 to set its output pressure reading value equal to the known pressure reading from the sensor 28. Digital or analog/digital pressure transducer devices with this type of calibration capability are commonly available.

Other calibration scenarios are also possible—including calibrating the pressure sensor 20 against a known external reference during refueling or service operations. These other scenarios achieve the goal of pressure sensor calibration, but they cannot be performed autonomously by the onboard vehicle systems. In one scenario for pressure sensor calibration of the hydrogen storage system 10, the external high-pressure hydrogen supply (not shown on figures) would be attached to the filling line 16, so that the vessels 14 could be filled to a high pressure with hydrogen. Either before or after the filling of the vessels 14, if the external supply system was equipped with an accurately calibrated pressure sensor (not shown), the external supply system's sensor could be used to calibrate the pressure sensor 20.

In another scenario involving the hydrogen storage system 10, a service procedure could be carried out, where an accurately calibrated external pressure sensor (not shown in figures) is attached to the filling line 16, and the pressure sensor 20 is calibrated against the value of the external sensor. The service procedure could include dropping the pressure in the hydrogen storage system 10 to the minimum allowable pressure before calibration, thus providing the greatest accuracy at the low end of the range of the pressure sensors 20.

Using any of the calibration methods described above, the accuracy of the pressure sensors used in hydrogen storage systems for fuel cell vehicles can be greatly improved. In particular, the disclosed fully autonomous methods and systems enable calibration of the onboard pressure sensors on an as-needed basis without external intervention. The increased accuracy of the pressure sensors allows a greater percentage of the onboard hydrogen fuel supply to be used, thus increasing vehicle driving range and customer satisfaction.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for calibrating a pressure sensor in a gas storage system, said gas storage system including one or more pressure vessels for storing a gas, where the gas is provided by the gas storage system to a downstream device, said method comprising:
 operating the gas storage system and the downstream device;
 monitoring pressure of the gas at a first pressure sensor in the gas storage system and a second pressure sensor in the downstream device;
 allowing the pressure of the gas at the first pressure sensor to drop to a regulation pressure of a pressure regulator which is located downstream of the first pressure sensor;
 verifying that the pressure regulator is fully open by detecting a drop in pressure at the second pressure sensor; and
 calibrating the first pressure sensor to the second pressure sensor.

2. The method of claim 1 wherein allowing the pressure of the gas at the first pressure sensor to drop to a regulation pressure of a pressure regulator includes closing vessel shut-off valves located downstream of each of the one or more pressure vessels to cause the pressure of the gas at the first pressure sensor to drop.

3. The method of claim 1 wherein verifying that the pressure regulator is fully open includes receiving a signal from the pressure regulator indicating that the pressure regulator is fully open.

4. The method of claim 1 wherein calibrating the first pressure sensor to the second pressure sensor includes adjusting for a pressure drop between the first pressure sensor and the second pressure sensor.

5. The method of claim 1 wherein calibrating the first pressure sensor to the second pressure sensor includes allowing the pressure of the gas at the first pressure sensor and the second pressure sensor to reach static equilibrium.

6. The method of claim 5 wherein allowing the Pressure of the gas at the first pressure sensor and the second pressure sensor to reach static equilibrium includes closing a system shut-off valve downstream of the second pressure sensor in the downstream device to prevent flow of the gas through the pressure regulator.

7. The method of claim 1 wherein the gas is hydrogen and the downstream device is a fuel cell system.

8. The method of claim 7 wherein the fuel cell system is used to power a vehicle.

9. A method for calibrating a pressure sensor in a hydrogen storage system for a fuel cell in a vehicle, said hydrogen storage system including one or more pressure vessels for storing hydrogen gas, where the hydrogen gas is provided by the hydrogen storage system to the fuel cell, said method comprising;
- operating the hydrogen storage system and the fuel cell;
- monitoring pressure of the hydrogen gas at a first pressure sensor in the hydrogen storage system and a second pressure sensor in the fuel cell;
- allowing the pressure of the hydrogen gas at the first pressure sensor to drop to a regulation pressure of a pressure regulator which is located downstream of the first pressure sensor;
- verifying that the pressure regulator is fully open; and
- calibrating the first pressure sensor to the second pressure sensor, including adjusting for a pressure drop between the first pressure sensor and the second pressure sensor.

10. The method of claim 9 wherein allowing the pressure of the hydrogen gas at the first pressure sensor to drop to a regulation pressure of a pressure regulator includes closing vessel shut-off valves located downstream of each of the one or more pressure vessels to cause the pressure of the hydrogen gas at the first pressure sensor to drop.

11. The method of claim 9 wherein verifying that the pressure regulator is fully open includes detecting a drop in pressure at the second pressure sensor.

12. A self-pressure-calibrating hydrogen storage system for a fuel cell, said hydrogen storage system comprising:
- one or more pressure vessels for storing hydrogen gas;
- a vessel shut-off valve for each of the pressure vessels;
- a first pressure sensor for measuring pressure of the hydrogen gas in the pressure vessels;
- a pressure regulator for reducing the pressure of the hydrogen gas from the pressure vessels to a regulation pressure;
- a second pressure sensor for measuring the pressure of the hydrogen gas at an inlet to the fuel cell; and
- a controller in communication with the pressure sensors, the shut-off valves, and the pressure regulator, said controller being configured to receive signals from the pressure sensors, the shut-off valves, and the pressure regulator, control opening and closing of the shut-off valves, and calibrate the first pressure sensor, where the controller is configured to calibrate the first pressure sensor to the second pressure sensor when the pressure regulator is in a fully open position, and the controller determines that the pressure regulator is in the fully open position by detecting a pressure drop at the second pressure sensor.

13. The hydrogen storage system of claim 12 wherein the controller adjusts for a pressure drop between the first pressure sensor and the second pressure sensor when calibrating the first pressure sensor.

14. The hydrogen storage system of claim 12 wherein the controller waits for the pressure of the hydrogen gas to reach static equilibrium between the first pressure sensor and the second pressure sensor before calibrating the first pressure sensor.

15. The hydrogen storage system of claim 12 wherein the second pressure sensor has a lower pressure measurement tolerance than the first pressure sensor.

16. The hydrogen storage system of claim 12 wherein the fuel cell is used to power a vehicle.

17. A self-pressure-calibrating hydrogen storage system for a fuel cell, said hydrogen storage system comprising:
- one or more pressure vessels for storing hydrogen gas;
- a vessel shut-off valve for each of the pressure vessels;
- a first pressure sensor for measuring pressure of the hydrogen gas in the pressure vessels;
- a pressure regulator for reducing the pressure of the hydrogen gas from the pressure vessels to a regulation pressure;
- a second pressure sensor for measuring the pressure of the hydrogen gas at an inlet to the fuel cell; and
- a controller in communication with the pressure sensors, the shut-off valves, and the pressure regulator, said controller being configured to receive signals from the pressure sensors, the shut-off valves, and the pressure regulator, control opening and closing of the shut-off valves, and calibrate the first pressure sensor, where the controller adjusts for a pressure drop between the first pressure sensor and the second pressure sensor when calibrating the first pressure sensor.

* * * * *